United States Patent
McGregor et al.

(10) Patent No.: US 11,255,986 B2
(45) Date of Patent: Feb. 22, 2022

(54) MICRO CAVITY FISSION CHAMBER RADIATION DETECTION SYSTEM

(71) Applicant: Douglas S. McGregor, Riley, KS (US)

(72) Inventors: Douglas S. McGregor, Riley, KS (US); Ryan G. Fronk, Manhattan, KS (US); Michael A. Reichenberger, Mount Hope, KS (US)

(73) Assignee: Douglas S. McGregor, Riley, KS (US)

( * ) Notice: Subject to any disclaimer, the term of this patent is extended or adjusted under 35 U.S.C. 154(b) by 491 days.

(21) Appl. No.: 15/891,479

(22) Filed: Feb. 8, 2018

(65) Prior Publication Data

US 2018/0180750 A1 Jun. 28, 2018

Related U.S. Application Data

(63) Continuation-in-part of application No. PCT/US2016/046498, filed on Aug. 11, 2016.

(60) Provisional application No. 62/203,817, filed on Aug. 11, 2015.

(51) Int. Cl.
*G01T 3/00* (2006.01)
*H01J 47/12* (2006.01)

(52) U.S. Cl.
CPC .............. *G01T 3/008* (2013.01); *H01J 47/12* (2013.01)

(58) Field of Classification Search
CPC ................................. G01T 3/008; H01J 47/12
See application file for complete search history.

(56) References Cited

U.S. PATENT DOCUMENTS

| | | | |
|---|---|---|---|
| 3,043,954 A | 10/1959 | Boyd et al. | |
| 3,375,370 A | 3/1968 | Hilborn | |
| 3,780,292 A | 12/1973 | Klar | |
| 4,190,910 A | 3/1980 | Teglund et al. | |
| 4,410,483 A | 10/1983 | Tomoda | |
| 4,569,817 A | 2/1986 | Underwood | |
| 8,519,315 B2 | 8/2013 | Griffith et al. | |

(Continued)

OTHER PUBLICATIONS

[1] G. F. Knoll, Radiation Detection and Measurement, Hoboken, N.J.: John Wiley, 2010.

(Continued)

*Primary Examiner* — Marcus H Taningco
(74) *Attorney, Agent, or Firm* — Brooks Kushman P.C.

(57) ABSTRACT

A radiation detector to monitor the neutron flux of a nuclear reactor or other high-radiation environment, that can withstand the high temperatures and radiation fields of such environment, is provided. A small dielectric substrate with a low neutron-activation cross section is provided. The substrate is coated with a neutron conversion material, such as uranium oxide or thorium oxide. One or more substrates form a micro-sized detection cavity that is filled with a detection gas. A voltage is provided across anode and cathode wires in the detection cavity. A neutron absorbed in the conversion material may release reaction products into the gas, causing ionization of the gas which then produces a current or voltage signal. The small detector volume minimizes energy deposition into the detection gas by competing particles such as gamma rays, fast electrons, and beta particles, and therefore minimizes false counts while retaining large signals from neutron interactions.

15 Claims, 12 Drawing Sheets

(56) References Cited

U.S. PATENT DOCUMENTS

| | | | |
|---|---|---|---|
| 2003/0150999 A1* | 8/2003 | Buffet | H01J 47/02 250/385.1 |
| 2006/0023828 A1 | 2/2006 | McGregor et al. | |
| 2006/0043308 A1 | 3/2006 | McGregor et al. | |
| 2006/0056573 A1 | 3/2006 | McGregor et al. | |
| 2006/0291606 A1 | 12/2006 | McGregor et al. | |
| 2007/0012110 A1 | 1/2007 | Robert | |
| 2012/0217406 A1* | 8/2012 | McGregor | G01T 3/00 250/361 R |
| 2012/0223242 A1* | 9/2012 | Brown | G01T 3/008 250/391 |
| 2013/0228696 A1* | 9/2013 | McGregor | G01T 3/008 250/382 |

OTHER PUBLICATIONS

[2] H. Böck and E. Balcar, "Long-Time Behaviour of Regenerating In-Core Neutron Detectors with 238U-239Pu Electrodes During Power Cycling," Nucl. Instrum. Meth., 124 (1974) pp. 563-571.
[3] C. Jensen, K. Condie, N. Woolstenhulme, T. Unruh, E. Larsen, R. Skifton, P. Calderoni, J. Svoboda, A. Fleming, Z. Hua, H. Ban, M. Reichenberger, J. Roberts, M. Harrison, D. Nichols, W. Fu, K. Kellogg, J. Hewitt and D. McGregor, "FY17 Report for Instrumentation Development for the Transient Testing Program," Idaho National Laboratory, Idaho Falls, ID, 2017.
[4] J.K. Shultis, R.E. Faw, Fundamentals of Nuclear Science and Engineering, CRC Press, Boca Raton, 2008.
[6] D.S. McGregor, M.D. Hammig, Y-H Yang, H.K. Gersch, and R.T. Klann, "Design Considerations for Thin Film Coated Semiconductor Thermal Neutron Detectors I: Basics Regarding Alpha Particle Emitting Neutron Reactive Films," Nucl. Instrum. Meth., A500 (2003) pp. 272-308.
[7] D.S. McGregor, M.F. Ohmes, R.E. Ortiz, A.S.N.S Ahmed, and J.K. Shultis, "Micro-Pocket Fission Detectors (MPFD) for In-Core Neutron Flux Monitoring," Nucl. Instrum. Meth., A554 (2005) pp. 494-499.
[8] M. A. Reichenberger, T.D.F. George, R. G. Fronk, P. B. Ugorowski, J. A. Geuther, J. A. Roberts, T. Ito, H. B. Vo-Le, S. R. Stevenson, D. M. Nichols, D. S. McGregor, "Advances in the Development and Testing of Micro-Pocket Fission Detectors (MPFDs)," in International Conference on Research Reactors: Safe Management and Effective Utilization, Vienna, Austria, Nov. 16-20, 2015.
[9] M. A. Reichenberger, D.M. Nichols, S.R. Stevenson, T.M. Swope, C.W. Hilger, J.A. Roberts, T.C. Unruh and D.S. McGregor, "Fabrication and Testing of a 4-Node Micro-Pocket Fission Detector Array for the Kansas State University TRIGA Mk. II Research Nuclear Reactor," Nucl. Inst. and Meth. Res. A, p. Submitted, 2017.
[10] M.A. Reichenberger, D.M. Nichols, S. R. Stevenson, T.M. Swope, C.W. Hilger, R.G. Fronk, J.A. Geuther, and D.S. McGregor, "Fabrication and Testing of a 5-Node Micro-Pocket Fisision Detector Array for Real-Time, Spatial, Iron-Wire Port Neutron-Flux Monitoring," Anal. of Nucl. Engy., No. 110, pp. 995-1001, 2017.
[11] M.F. Ohmes, A.S.M.S. Ahmed, R.E. Ortiz, J.K. Shultis, D.S. McGregor, "Micro-Pocket Fission Detector (MPFD) Performance Characteristics," in IEEE Nucl Sci. Symp., San Diego, CA, Oct. 29-Nov. 3, 2006.
[12] J.J. Duderstadt and L.J. Hamilton, Nuclear Reactor Analysis, Wiley & Sons, Inc., New York, 1976.
[13] M.F. Ohmes, D.S. McGregor, J.K. Shultis, P.M. Whaley, A.S.M.S. Ahmed, C.C. Bolinger, T.C. Pinset, "Development of Micro-Pocket Fission Detectors (MPFD) for Near-Core and In-Core Neutron Flux Monitoring," Proc. SPIE, 5198 (2003) pp. 234-242.
[16] J. Ziegler and J. Biersack, SRIM-2000 Code (IBM, 2000).
[17] M.F. Ohmes, D.S. McGregor, J.K. Shultis, A.S.M.S. Ahmed, R. Ortiz, R.W. Olsen, "Recent Results and Fabrication of Micro-Pocket Fission Detectors (MPFD)," Proc. SPIE, vol. 6319 (2006) p. 1P1-1P9.
18 T. Unruh, J. Rempe, D. McGregor, P. Ugorowski, M. Reichenberger, T. Ito; NEET Micro-Pocket Fission Detector—FY 2013 Status Report; pp. 1-38.
PCT/US2016/046498 International Search Report dated Dec. 5, 2016.
PCT/US2016/046498 Written Opinion dated Feb. 13, 2018.
T. Unruh, NEET Micro-Pocket Fission Detector—FY 2013 Status Report, pp. 1-52, Sep. 2013, Idaho National Laboratory.†

\* cited by examiner
† cited by third party

MICRO CAVITY FISSION CHAMBER RADIATION DETECTION SYSTEM

CROSS-REFERENCE TO RELATED APPLICATIONS

This application is a Continuation in Part of PCT/US2016/046498 filed Aug. 11, 2016, which claims the benefit of U.S. provisional patent application No. 62/203,817, filed Aug. 11, 2015, the disclosures of which are incorporated in their entirety by reference herein.

STATEMENT OF GOVERNMENT RIGHTS

The invention was partially funded by the U.S. Government under the Department of Energy Grant No DE-SC0017692. Accordingly, the US Government may reserve certain rights to its use.

TECHNICAL FIELD

This invention relates particularly to a new type of miniaturized neutron detector that is inherently insensitive to gamma-ray radiation and can withstand the high-heat and high-radiation environments such as those found inside an operating nuclear reactor environment, including the nuclear reactor core.

BACKGROUND

1. Field of Invention

This invention relates to neutron detectors, methods of making the same, and in particular, to miniaturized fission neutron detectors for use in a high neutron flux environment and methods of making the same.

2. Background Art

The following U.S. patent documents are related to the present invention: U.S. Pat. Nos. 3,043,954, 4,569,817, 3,375,370, 3,780,292, 4,140,910; 8,519,3150; 2006/0056573; 2006/0043308; 2006/0023828; 2006/0291606; 2007/0012110.

REFERENCES REFERRED TO HEREIN

[1] G. F. Knoll, Radiation Detection and Measurement, Hoboken, N.J.: John Wiley, 2010.
[2] H. Bock and E. Balcar, "Long-Time Behaviour of Regenerating In-Core Neutron Detectors with $^{238}$U-$^{239}$Pu Electrodes During Power Cycling," Nucl. Instrum. Meth., 124 (1974) pp. 563-571.
[3] C. Jensen, K. Condie, N. Woolstenhulme, T. Unruh, E. Larsen, R. Skifton, P. Calderoni, J. Svoboda, A. Fleming, Z. Hua, H. Ban, M. Reichenberger, J. Roberts, M. Harrison, D. Nichols, W. Fu, K. Kellogg, J. Hewitt and D. McGregor, "FY17 Report for Instrumentation Development for the Transient Testing Program," Idaho National Laboratory, Idaho Falls, Id., 2017.
[4] J. K. Shultis, R. E. Faw, Fundamentals of Nuclear Science and Engineering, CRC Press, Boca Raton, 2008.
[5] S. Kahn, R. Harman, and N. Forgue, "Energy Distributions of Fission Fragments from Uranium Dioxide Films," Nucl. Sci. Eng., 23 (1965) pp. 8-20.
[6] D. S. McGregor, M. D. Hammig, Y-H Yang, H. K. Gersch, and R. T. Klann, "Design Considerations for Thin Film Coated Semiconductor Thermal Neutron Detectors I: Basics Regarding Alpha Particle Emitting Neutron Reactive Films," Nucl. Instrum. Meth., A500 (2003) pp. 272-308.
[7] D. S. McGregor, M. F. Ohmes, R. E. Ortiz, A. S. N. S. Ahmed, and J. K. Shultis, "Micro-Pocket Fission Detectors (MPFD) for In-Core Neutron Flux Monitoring," Nucl. Instrum. Meth., A554 (2005) pp. 494-499.
[8] M. A. Reichenberger, T. D. F. George, R. G. Fronk, P. B. Ugorowski, J. A. Geuther, J. A. Roberts, T. Ito, H. B. Vo-Le, S. R. Stevenson, D. M. Nichols, D. S. McGregor, "Advances in the Development and Testing of Micro-Pocket Fission Detectors (MPFDs)," in International Conference on Research Reactors: Safe Management and Effective Utilization, Vienna, Austria, Nov. 16-20, 2015.
[9] M. A. Reichenberger, D. M. Nichols, S. R. Stevenson, T. M. Swope, C. W. Hilger, J. A. Roberts, T. C. Unruh and D. S. McGregor, "Fabrication and Testing of a 4-Node Micro-Pocket Fission Detector Array for the Kansas State University TRIGA Mk. II Research Nuclear Reactor," Nucl. Inst. and Meth. Res. A, p. Submitted, 2017.
[10] M.A. Reichenberger, D. M. Nichols, S. R. Stevenson, T. M. Swope, C. W. Hilger, R. G. Fronk, J. A. Geuther, and D. S. McGregor, "Fabrication and Testing of a 5-Node Micro-Pocket Fisision Detector Array for Real-Time, Spatial, Iron-Wire Port Neutron-Flux Monitoring," Anal. of Nucl. Engy., no. 110, pp. 995-1001, 2017.
[11] M. F. Ohmes, A. S. M. S. Ahmed, R. E. Ortiz, J. K. Shultis, D. S. McGregor, "Micro-Pocket Fission Detector (MPFD) Performance Characteristics," in IEEE Nucl. Sci. Symp., San Diego, Calif., Oct. 29-Nov. 3, 2006.
[12] J. J. Duderstadt and L. J. Hamilton, Nuclear Reactor Analysis, Wiley & Sons, Inc., New York, 1976.
[13] M. F. Ohmes, D. S. McGregor, J. K. Shultis, P. M. Whaley, A. S. M. S. Ahmed, C. C. Bolinger, T. C. Pinset, "Development of Micro-Pocket Fission Detectors (MPFD) for Near-Core and In-Core Neutron Flux Monitoring," Proc. SPIE, 5198 (2003) pp. 234-242.
[14] J. L. Vossen, W. Kern, Eds., Thin Film Processes, (Academic, Orlando, 1978).
[15] W. S. Ruska, Microelectronic Processing, (McGraw-Hill, New York, 1987).
[16] J. Ziegler and J. Biersack, SRIM-2000 Code (IBM, 2000).
[17] M. F. Ohmes, D. S. McGregor, J. K. Shultis, A. S. M. S. Ahmed, R. Ortiz, R. W. Olsen, "Recent Results and Fabrication of Micro-Pocket Fission Detectors (MPFD)," Proc. SPIE, Vol. 6319 (2006) pp. 1P1-1P9.

The need to monitor the neutron flux (i.e. neutrons per square centimeter per second, n cm$^{-2}$ s$^{-1}$) within the core of a nuclear reactor has driven much research in varying methods of detecting said neutron flux. The neutron flux within the core of a nuclear reactor is indicative of its operational power level; where it is found that an increase in the neutron flux indicates an increase in the operational power level. In order to gain a complete understanding of the operation of a nuclear reactor, the neutron flux and power level must be accurately reported to operators. The high-radiation and high-heat environment found within a nuclear reactor core are not conducive to the operation of many types of radiation detectors. First, the high neutron flux found within a reactor core, often on the order of $10^{14}$ n cm$^{-2}$ s$^{-1}$, with very high gamma-ray exposures rates ($10^8$ R/h), will either burn up a detector's neutron conversion material too quickly, reducing the device's overall lifetime, or will induce a count rate so high that the detector becomes unreliable. Second, the high-heat present within most reactor cores, often exceeding 400° C., would either destroy many detectors systems (such as scintillators) or render them entirely unusable (such as would be the case for most semiconductors). Currently, solutions exist to monitor the neutron flux externally via radiation monitors that are kept well outside of the core. However, measurements can be skewed due to scattering and/or buildup within the materials found between the core and the detector system. Furthermore, information regarding minute variations in flux around the core, due to fuel burn up or control-rod insertion etc., is entirely lost at distances outside of the reactor core.

Development and deployment of small, accurate, and robust neutron flux measurement systems is an important enhancement for advancing nuclear fuel technology. A need exists for both nuclear test reactors, and commercial power reactors, to place neutron sensors within the reactor core to provide information on the local neutron flux [1]. Furthermore, in-core sensors may typically be located within narrow channels within the reactor core (<10 cm in diameter) [1]. The physical requirements for in-core neutron sensors limit material selection and device geometry. Several technologies exist which are used to measure neutron flux for in-core and near-core environments.

Ionization chambers and fission chambers are commonly used for near-core neutron measurements [1]. Typical ionization and fission chambers are necessarily large, and are only capable of monitoring neutrons which have escaped the reactor core. Such devices are impractical for in-core measurements because of their large size, fragile construction, and large flux perturbation. Miniature fission chambers are commonly used for in-core neutron measurements. Miniature fission chambers are typically lined with highly enriched uranium, and are typically made in a cylindrical geometry [1]. Device dimensions for miniature fission chambers are usually in the mm to cm range. The burnup of fissile material and buildup of fission fragments in sealed miniature fission chambers greatly limits the application of such devices for extended periods of time. A fission chamber using enriched $^{235}$U will decrease in sensitivity by 10% after a total neutron fluence of $10^{20}$ n cm$^{-2}$ in a typical power nuclear reactor [2]. In order to extend stable device lifetime, fertile isotopes can be added to the neutron-sensitive coating [2]. The buildup of fission fragments in the sealed gas chamber of typical miniature fission chambers also produces a 'memory effect', where the radioactive decay of fission fragments in the detection gas produces a residual current, reducing device accuracy [1].

Alternatively, iron or gold activation analysis can be used to determine the neutron fluence within a reactor core during an operational period. However the neutron fluence is not as useful for experiments in high-performance reactors, transient test reactors, and critical mock-ups, which distinctly benefit from real-time flux measurement [3].

Finally, self-powered neutron detectors (SPND) incorporate neutron-sensitive materials that decay by beta or gamma-ray emission. The simplest versions of SPNDs rely on the direct measurement of the beta decay current following a neutron absorption [1]. In contrast to typical fission chambers, SPN detectors are typically very small, and require no applied bias. However, the output current from SPN detectors is very small, and does suffer a time delay due to the nuclear decay [1]. There are fast responding SPN detectors, but they are based on gamma-ray reactions, combined with neutron reactions, which confuse the actual source of the signal. The gamma-ray sensitive SPN detectors are generally 100 times less sensitive to the radiation environment. Consequently, they are generally not used for reactor startup, shutdown, or quantitative transient measurements.

Gas-filled detectors are arranged in three forms, those forms being ion chambers, proportional counters, and Geiger-Muller counters. Of these basic forms, the proportional counter design is often used as the fundamental instrument for a gas-filled neutron detector. Proportional counters rely upon avalanche multiplication in the gas to produce large electronic signals, each signal being proportional to the energy deposited in the detector chamber. Quite differently, ion chambers do not produce avalanche multiplication and Geiger-Muller counters produce excessive avalanching such that the electronic signal is no longer proportional to the energy deposited in the chamber.

Gas-filled proportional counters used for neutron detectors can be further subdivided into two types, those being detectors filled with a neutron reactive gas and those detectors that are coated with a neutron reactive material. Neutron interactions in either the neutron reactive gas or the neutron reactive coating eject energetic charged particles that create ionization in the detector gas. A voltage applied to the gas chamber causes the ions and electrons to move, and this ionization is subsequently measured as a current, thereby, indicating a neutron interaction occurred.

Gas detectors can be operated in pulse mode or current mode. Pulse mode is generally used in low to moderate radiation fields. In such a case, a single radiation quantum, such as an alpha particle, beta particle or gamma ray, interacts in the chamber volume, giving rise to an ionized cloud. The charge carriers drift apart, and as they move they induce current to flow to the device terminals; a charging circuit, usually consisting of a preamplifier and feedback loop, integrates the current and stores the charge, thereby producing a voltage potential. This voltage is measured as a single event, indicating that a single radiation quantum has been detected. The preamplifier circuit is subsequently discharged and reset, allowing the device to measure the next radiation interaction event. Hence, each voltage pulse from the detector indicates an individual radiation interaction event. Although extremely useful, there are drawbacks to this method. Should another radiation interaction occur while the detector is integrating or discharging the current from a previous interaction event, the device may not, and usually does not, record the new interaction, a condition referred to as pulse pile up. The time duration in which a new pulse cannot be recorded is the detector recovery time, sometimes referred to as dead time. A pulse mode detector operated in low radiation fields has little problem with dead time count losses. However, a detector operated in high radiation fields may have significant dead time losses, thereby yielding an incorrect measurement of the radiation activity in the vicinity.

For high radiation fields, gas detectors are operated in current mode, in which the radiation induced current is measured on a current meter. Under such conditions, many interactions can occur in the device in short periods of time, and the current observed increases with total radiation exposure rate. Hence, current mode can be used to measure high radiation fields, with the magnitude of the current being a measure of the radiation induced ionization rate in the detector, thereby, giving a measure of the radiation field in which the device is being operated. The disadvantage of current mode is that it does not identify individual radiation interactions.

FIG. 1 illustrates a gas-filled detector similar to that first explored by Geiger and Rutherford. The detector is exposed to directly ionizing radiation, which would include alpha particles and beta particles. Either of these particles can cause ionization in the gas-filled device, thereby, producing electron-ion pairs. Hence, there are both an absorber and an observable, so that to produce a radiation detector only a method is needed to measure the amount of ionization. Suppose the device is connected to a simple electrometer so as to measure the current produced by the motion of the electron-ion pairs. Without an applied voltage, the electron-ion pairs diffuse randomly in all directions and eventually recombine, and, as a result, the net current from the electrometer is zero. With an applied positive voltage to the thin wire of the device, or anode, the free electrons (negative charge) drift towards the anode and the free ions (positive charge) drift towards the detector wall. At low voltages, some measurable current is seen, yet considerable recombination still occurs, which is the recombination region identified as Region I in FIG. 2. As the voltage is increased, electron-ion pair separation becomes more efficient until practically no recombination occurs. Hence, the current measured is a measure of the total number of electron-ion pairs formed, which is Region II of FIG. 2, and is referred to as the ionization chamber region.

As the voltage is increased further, the electrons gain enough kinetic energy to create more electron-ion pairs through impact ionization. This provides a mechanism for signal gain, often referred to as gas multiplication. As a result, the observed current increases as the voltage increases, but is still proportional to the energy of the original radiation particle. This multiplication occurs in Region III, the proportional region. Increasing the applied voltage further causes disproportional current increases to form, marked in FIG. 2 as Region Ma, beyond which, in Region IV, all currents, regardless of origin, radiation species or energies, are the same magnitude. Region IV is the Geiger-Muller region. Finally, excessive voltage drives the detector into Region V where the voltage causes sporadic arcing and other spontaneous electron emissions to occur, hence causing continuous discharging in the detector. Gas detectors should not be operated in the continuous discharge region.

SUMMARY

A special type of coated gas-filled radiation detectors are fission chambers. These detectors have fissile or fissionable materials as coatings, which upon a neutron absorption, fission and emit two highly energetic fission products. The energy released per $^{235}$U fission is approximately 207 MeV, with ~168 MeV of the energy being carried as kinetic energy from the two fission fragments. The remaining 39 MeV is released in the form of gamma rays, fast neutrons, beta particles, and neutrinos, most of which escape detection. Usually two fission fragments share 168 MeV as kinetic energy, although there is a slight chance of triplet fission, where two relatively large fission products are released along with a much smaller fission product (such as a triton, Li ion, or B ion) [4].

These two fission fragments are released with different kinetic energies and masses, with average energies of 68.1 MeV and 99.2 MeV for each branch. The variety of possible fission fragments numbers in the hundreds with atomic masses ranging from 70 up to 170. The fission product mass and energy distributions for fissile materials $^{233}$U, $^{235}$U, $^{239}$Pu have similar distributions, although they are slightly different.

The large energy release from fission provides an attractive converter for neutron detectors, mainly because the energy from either fission product can be measured without the need for avalanche multiplication. As a result, most fission chambers are designed as ion chambers. The ranges of fission products in 1 atm of Ar are between 1.5 cm-2.9 cm, depending on the mass and energy; hence many fission chambers are designed with dimensions on the same order. Upon nuclear fission, the fission fragments are ejected in approximately opposite directions, although the other energetic fission emissions cause a slight change in these trajectories. Consequently, like many other coated neutron detectors, only one of the fission products is likely to be measured. Theoretical models developed by Kahn et al. [5] predict the pulse-height spectra for a thin film coating of $UO_2$ on a surface within a gas detector, with a solid angle of ~$2\pi$, with a few select results shown in FIG. 3 as compared to measured pulse height spectra. For relatively thin films, the two fission fragment branches are clearly discernable. For thicker films, the energy distribution becomes skewed towards the lower energies, a consequence of energy self-absorption for fission products that lose energy as they transit the $UO_2$ film before emerging into the detector gas. Because the lightest and most energetic fission products cannot reach the detector gas if born at a distance greater than ~8.0 there is no practical reason to apply films any thicker. Hence, the thermal neutron detection efficiency for a $^{235}UO_2$-coated detector is limited to 0.5%, a value predicted by methods described by McGregor et al. [6]. Fission chambers with U metal instead of $UO_2$ are also manufactured, and have a higher density of U per unit volume. However, the fission product ranges in U are also shorter (≤6 µm) than in $UO_2$[16]; consequently, the resultant thermal neutron detection efficiencies are also ≤0.5%.

A new type of miniaturized fission chamber is the micropocket fission detector (MPFD). These devices are significantly smaller than common fission chambers, having physical dimensions of <1 cm with gas volumes <1.0 $cm^3$ or less. Although the small volumes are incapable of absorbing the total energy from any of the fission products, the amount of energy absorbed is on the order of 3 MeV for all fission products, regardless of the branch [7]. The small volume ensures that background gamma rays and beta particles cannot deposit enough energy to be detected, usually depositing less than 1 keV. Alpha-particle emissions from the reactive coating can deposit more energy, but also is on the order of only 60 keV or less. Hence, simple pulse-height discrimination can be used to separate neutron induced events from radiation background. MPFDs are designed with relatively low efficiency because they are deployed in high radiation environments, including inside the core of a nuclear reactor. Their small size allows for them to be inserted into tiny test ports without causing flux depression. Dead time is also less of an issue, mainly because the electron-ion drift times are much smaller for these detectors than traditional fission chambers. These detectors can operate in pulse mode for neutron fluxes ranging up to $10^{12}$ n $cm^{-2}$ $s^{-1}$ before showing significant dead-time effects. Described here are new designs for MPFDs that allow for extended performance in high radiation fields, which allow for pulse mode and current mode operation in neutron fluxes beyond $10^{15}$ n $cm^{-2}$ $s^{-1}$, a significant improvement from previous designs.

Described here is a novel type of radiation detector system that can be inserted into the core of a nuclear reactor, survive the harsh operating environment found within, return real-time count rate information, maintain a long detector lifetime, and provide count rate information relative to its position within the core. This detector has been developed to accomplish these goals with minimal cost and minimal supporting electronics. Prototypical detector systems have been fabricated and tested recently, reducing the invention to practice [8-10].

Having been fabricated from radiation-hard materials, and being designed for prolonged lifetime, MPFDs can be used in a wide range of capacities. Accurate, real-time flux measurements can drastically improve the effectiveness and safety of research involving high performance reactors, transient test reactors and critical mockups. Due to their small size, the use of MPFDs in transient power and research reactors allow for dense instrumentation inside a nuclear reactor core. Also, by strategically placing an array of MPFDs throughout the reactor core, a real-time flux map can be generated without significantly perturbing the neutron flux, mainly due to the small size of these new detectors.

MPFDs can also aid with out-of-core fuel management. The "once-through" fuel cycle policy in the U.S.A. currently requires spent fuel to be stored after use. While many other countries worldwide reprocess spent fuel, accurate analysis and monitoring of spent fuel is important whether reprocessed or stored. Burnup calculations of commercial fuel are typically based on an estimate from specialized computer codes. While these burnup estimates are sufficient for spent fuel storage, improved accuracy of real-time data will aid in validating the various computer codes used for transport, storage, and reprocessing of spent fuel, as well as fissile material safeguards and evaluating the performance of new nuclear fuels. MPFDs can be integrated into a fuel assembly and used to calculate the integral and time-dependent irradiation exposure of the fuel in that region. The irradiation measurement from a MPFD in commercial power reactors could also provide more accurate input for burnup simulations of spent fuel than present methods.

MPFDs operate on similar principles as typical fission-chamber neutron detectors. By designing a very small gas detector, many disadvantages of typical fission chambers are avoided. Additionally, by using a loose-stack design where the detection gas of the MPFD is allowed to circulate within a larger container, the buildup of fission fragments in the detection gas is minimized, and the 'memory effect' previously described does not occur. Finally, by utilizing the numerous surfaces within the MPFD geometry, production of 'mixed-coated' devices is greatly simplified. Although possible, mixing materials into a single coating introduces significant production challenges. Instead, various materials may be deposited on different surfaces individually.

MPFDs vary from miniature fission chambers in several ways. First, MPFDs use a much smaller detection gas chamber than typical miniature fission chambers (<1 $cm^3$ vs >1 $cm^3$). Such MPFDs have utilized anode and cathode wires free of fissile material. In fact, MPFDs have been fabricated and tested with gas volumes of approximately 0.5 $mm^3$.

Secondly, where miniature fission chambers are typically designed for short lifetimes, using enriched materials, MPFDs are being designed for extended life using mixed coatings of neutron reactive materials, including U, Th and Pu. The loose-stacked design of MPFDs poses a significant shift from the sealed design used for most fission chamber style neutron detectors. For example, a typical MPFD will be composed of one or more radiation-hard device substrates (i.e. ceramic) assembled together, or manufactured in such a way to create a detection gas chamber with a volume <1 $cm^3$. The detection gas chamber is open to the exterior of the MPFD sensor, but within a larger gas-filled enclosure, to allow detection gas to flow into and out of the chamber. One or more surfaces of the detection gas chamber are coated with neutron-sensitive material, the selection of which varies depending on desired device application. Finally, an anode and cathode wire are present, across which a voltage is applied to measure the ionization that occurs in the detection gas chamber due to fission fragment ionization. Numerous variations of the generic MPFD geometry are described in the following sections. One embodiment of the MPFD for particularly high radiation applications does not utilize gas in the detection chamber as the source of ionized charge carriers. Instead, a sputtering material injects charged ions and electrons into an evacuated chamber when the energetic fission fragments bombard the sputtering material's surface. The discrimination capabilities of such an MPFD are enhanced by the reduction of gas in the chamber, and by the amount of energy required to cause sputtering.

Small fission chambers with parallel contact designs have functioned in a similar manner to MPFDs in the past [7,11,17]; however, there are multiple problems with sealing these small fission chambers and connecting wires to the conductive contacts. Unlike traditional fission chamber designs that have planar electrodes, usually coated with the neutron reactive material, a preferred embodiment of the present design has two or more wires oriented mostly parallel to each other that act as the electrodes. The neutron-reactive material may be located near the electrode wires but must not necessarily be located upon the electrode wires, further distinguishing MPFDs from other fission chambers. Hence, there is no need to connect the signal wires to electrical contacts because the signal wires serve as both the electrodes and signal wires. The use of anode and cathode wires in place of a coaxial or parallel plate design simplifies fabrication and improves device robustness. Unlike other fission chambers, there is no longer a need to seal the MPFD. Instead the pieces stack together and operate without a sealant. The entire structure can be inserted into a gas-filled tube, which is backfilled with an appropriate detector gas and sealed. The metallic tube can also function as a ground and RF shield for the detectors. A benefit of the design is that multiple pieces can be stacked to build multiple fission chambers, or several longer fission chambers composed of longer elements, upon a single string of wire electrodes. The multi-wire micro-pocket fission chamber, a preferred embodiment depicted in FIG. 4, has several surfaces upon which neutron reactive material (4) may be deposited, including the sides of the cavity substrate FIG. 4 (32), an inner surface of upper substrate FIG. 4 (34), and an inner surface of the lower substrate FIG. 4 (31). These multi-wire micro-pocket fission chambers can be fabricated in microscopic sizes that are capable of producing large signals from neutron interactions while remaining insensitive to other radiations such as alpha particles, beta particles, and gamma rays. By fabricating devices with thin neutron reactive films, detectors can operate in pulse-mode at high neutron fluxes (>$10^{12}$ n $cm^2$ $s^{-1}$) without significant dead-time. Further, these multi-wire fission chambers can be fashioned in an array such that the array of detectors all share a common cathode wire while having independent anode wires.

The substrates are best constructed from materials that do not interact with neutrons. Construction materials of interest that have low neutron interaction cross sections include Si, $SiO_2$, Quartz, Diamond, SiC, AlN, GaN, $Al_2O_3$, and MgO. Low interaction cross sections ensure that the detectors will not adversely affect the power and neutronics of the reactor core while being relatively radiation hard. Presently, $Al_2O_3$ is used for MPFDs. However, the material is extremely hard (9 on the Mohs hardness scale) and mostly inert to chemical attack [13] and is thus difficult to machine into tiny parts. Unfortunately, the cost and difficulty of manufacturing alumina-based MPFDs are both extreme, and a process to produce low-cost and reliable MPFDs is needed.

An alternative material of interest is the semiconductor Si. Si is readily etched by either plasma or wet etching, and, hence, detectors can be fashioned with common VLSI (i.e. very large scale integration) processing techniques. Contact application can also be accomplished with physical vapor deposition with either evaporative or sputtering methods. Although Si can undergo neutron transmutation, the material serves as a mechanical substrate and not as an electronic medium; hence, transmutation is not an issue. Although Si is semiconductive, thereby, not having the high resistance needed for the substrate, a thick $SiO_2$ layer is easily grown on the substrate with common wet-oxide methods used to fabricate MOS (i.e. metal-oxide-semiconductor) devices [14,15]. Other low cross section materials that are of interest include $SiO_2$ (glass), Quartz, SiC, AlN, $Al_2O_3$, GaN, Diamond, and MgO. All of these materials can be used as alternative MPFD substrates because of their radiation hardness, reliability, and manufacturability.

The neutron-reactive materials often require a sublayer be applied to aid attachment to the substrate. For instance, a thin Ti or Pt layer may be required to attach U, Th, or Pu to an insulating substrate. Sometimes a layering approach of multiple bonding layers is required to attach the neutron reactive film. Under some circumstances, a sublayer is not always required for the film application. For instance, application with physical vapor deposition methods such as evaporation or sputtering may not require a sub-layer. For this reason, MPFDs can be produced with the neutron reactive material being located separate from the anode or cathodes, unlike traditional fission chambers in which the fissile material is exclusively found on the surface of the anodes and/or cathodes. The neutron-reactive coating must have sufficiently high neutron absorption to allow for reasonable neutron detection, yet not so large so as to burn-up the neutron reactive material rapidly. Reactive film candidates for the MPFDs include, but are not limited to, natural U, Pu, enriched $^{235}U$, $^{232}Th$, and $^{242}Pu$. The corresponding microscopic thermal neutron fission cross sections are 577 barns for pure $^{235}U$, and only 4 barns (E>1.1 MeV) for $^{232}Th$. MPFDs with both $^{232}Th$ and $^{235}U$ were reported to respond to both thermal and fast neutrons in a nuclear reactor [7,11,17].

The devices disclosed are unique because of their miniature size and rapid response, generally being <1-cm wide. The energy deposition and ranges of $^{232}Th$ and $^{235}U$ fission products in 1 atm of P-10 gas extend beyond several cm [16]. Only a fraction of energy for any fission fragment is deposited within a 1-cm wide cavity of P-10 gas [17]. For MPFDs with $^{235}U$ as the reactive film, fission fragments from both branches (~95 MeV bromine, ~60 MeV iodine, for example) will deposit of approximately 3 MeV of energy within a 500-μm wide pocket [7, 17]. Energies of such large magnitude are easily discriminated from background gamma rays, and the thin gas pocket requires only 25-200 volts operating bias. Construction materials with low gamma-ray absorption will reduce background interference.

In order to design MPFDs for long-term in-core deployment, the reactive material must be chosen carefully to ensure a relatively stable response over long periods of time. For commercial reactors, in-core detectors could be inserted for single cycles (about 18 months) or for the duration of an assembly's time in a reactor (about 5 years). Although any neutron-reactive material may be used for an MPFD, a combination of fissile materials can be used to extend the detector life. By determining an optimum combination of these materials, the signal deviation over time (for a constant flux) can be reduced.

The MPFDs can be constructed using a loose stacking scheme, although sealed MPFDs will also operate properly. The loose stacking design (FIG. 4) has three MPFD pieces strung onto two conductive wires FIG. 4 (3). These wires no longer need to be attached or bonded directly to the assembly, a major difference from past designs. A voltage applied across the two wires produces an electric field inside the central pocket, formed by the center piece. The neutron reactive materials are plated or incorporated on an inside surface of the MPFD chamber. As a result, the neutron reactive material is no longer atop the conductive contacts, as reported and required in early generation designs [7,11,17]. The detector parts do not need to be bonded with cement, as with prior reported designs [7,11,17], because they are stacked and inserted inside a gas-filled tube.

MPFD substrates can be etched with either dry-etching or wet-etching methods, thereby, greatly reducing cost and allowing for easy manufacturing. Of particular interest is the use of Si wafers, which can allow for mass production of MPFDs on Si wafers with the exact miniature MPFD features, and then subsequently sliced from the wafer. With the use of vapor vacuum bonding (i.e. vacuum bonding is performed with water vapor and no other adhesives), the entire MPFD can be manufactured at the wafer scale, with completed devices sliced from the bonded wafers. High-resistivity semiconductors, such as GaN, SiC and AlN, can be etched with reactive ion etching and do not need an insulating coating (although an insulating layer can be applied with physical vapor deposition methods). AlN can also be etched with wet chemistry. Insulators such as $SiO_2$ can be wet etched to the proper MPFDs dimensions in relatively short time. The neutron reactive materials can be plated on the upper and lower MPFD pieces.

Thermocouple sensors can be added to monitor the temperature at the detector locations in the core. The entire array structure can be enclosed in a gas-filled tube, backfilled with a gas such as pure Ar. The entire gas-filled tube can be inserted into a nuclear reactor. The entire gas-filled tube can be attached inside a nuclear fuel bundle.

Disclosed is a new type of miniaturized neutron detector suitable for applications in all types of nuclear reactors solving many of the problems with present day in-core reactor instrumentation. The small size is non-intrusive, will not cause flux depression or unwanted perturbations in the neutron flux even for small research reactors, and will not significantly disrupt fluid flow in many cases. The compactness is particularly suited for Gen-IV and small modular reactors. With the capabilities and characteristics verified through this research, the detectors can be incorporated into power reactor cores, thereby, offering real-time flux and power profiling. Such applications would be the basis for a follow-on study. Inclusion of thermocouples with the MPFDs adds information on the reactor thermal profile. Detector arrays distributed within a core allow for the development of core power maps. A list of advantages of the disclosed invention include:

1. Compact size—the dimensions are small <1 cm.
2. Extreme radiation hardness—the gas and substrate construction do not suffer significant radiation damage.

3. Thermally resistant—the devices can be manufactured from high-temperature ceramics or high temperature radiation resistant materials.

4. Gamma-ray insensitive—the detection gas, small size, and light material composition all work to make the device very gamma-ray insensitive, hence the neutron signals are easily discernable from background gamma-ray interference.

5. Inexpensive—construction is straightforward and requires inexpensive materials.

6. Large signals—the reaction products are highly energetic and the output signals easy to detect.

7. Deployment at power reactors—Successful demonstration of the MPFD concept can lead to detector usage in commercial reactors, research reactors, small modular reactors and Gen-IV reactors.

8. Core imaging—The devices can be used to back-project the fuel power densities from within a commercial, research, or Gen-IV nuclear reactor.

9. Power and thermal monitoring—The materials and devices are particularly suited for the environment expected inside a Gen-IV reactor, including temperatures above 400° C., pressures >2300 psi while under neutron irradiation.

10. Thermocouples can be intertwined with the MPFDs to provide temperature information.

11. Compatible with advanced reactor materials—The devices fulfill a need for Gen-IV reactors that use advanced materials. Gen-IV reactors need in-core detectors for (a) initial monitoring studies of prototype assemblies and fuel materials, and (b) control of commercial units when they are deployed.

12. The small devices are fast and can follow reactor transients. They can be used at reactor startup and shutdown while continuing to produce a signal representative of the actual reactor power level.

The MPFD technology provides a new power-monitoring device for research nuclear reactors and commercial nuclear reactors extending to Gen-IV reactors. The detectors can be inserted with fuel bundles of commercial reactors and operated during an entire fuel cycle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
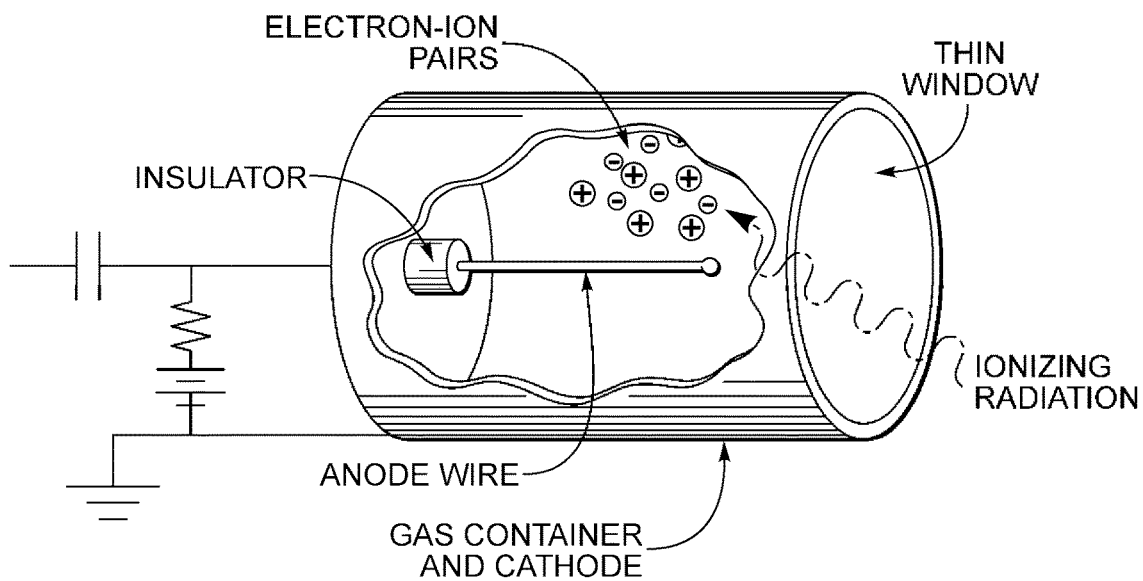
FIG. 1 shows a diagram of a coaxial gas-filled radiation detector; this configuration is used for a variety of gas-filled detectors, including ion chambers, proportional counters, and Geiger-Müller counters.

FIG. 1 is a prior art depiction of a coaxial gas-filled radiation detector, showing the main components of an anode, cathode and radiation induced ionization. The free electrons and positive ions are drifted through the chamber by an externally applied bias voltage. The motion of the free charges induces a current to flow in the circuit, which can be measured by an externally connected circuit.

Figure 2:
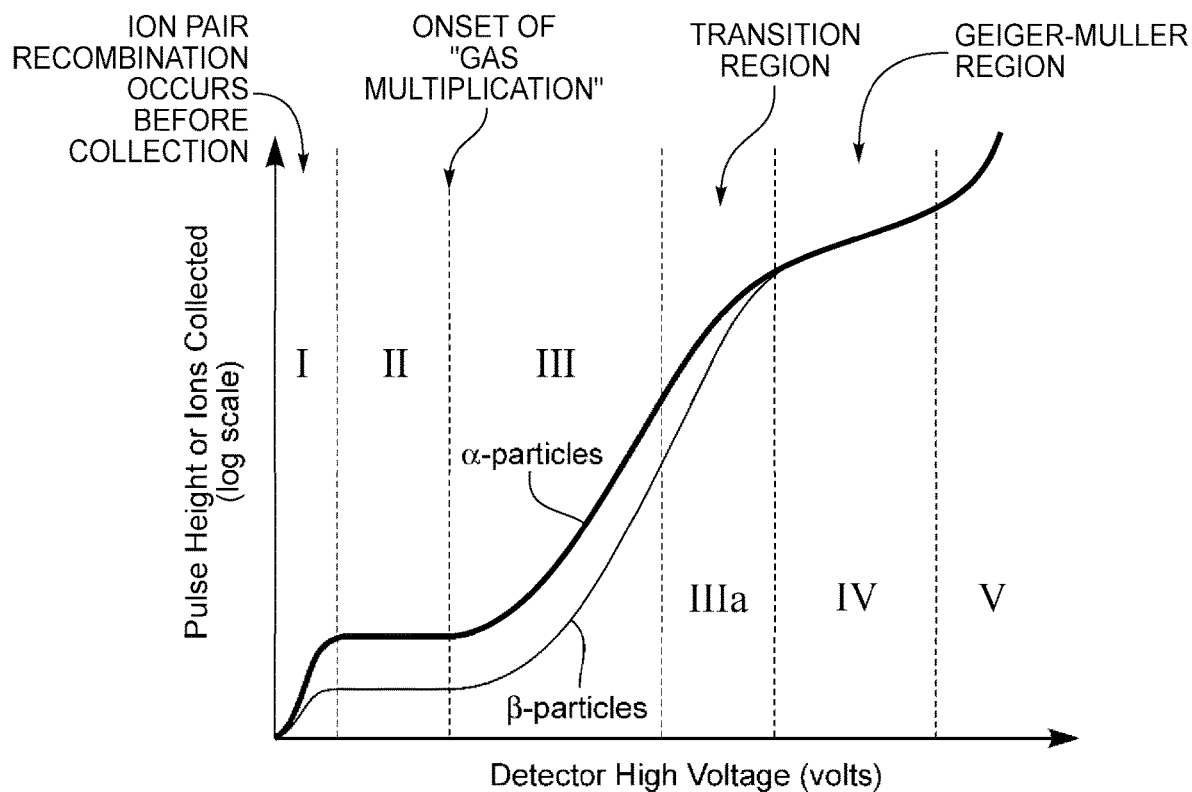
FIG. 2 shows the gas-filled detector pulse height response as a function of applied voltage, showing the five major operational regions.

FIG. 2 is a depiction of the five voltage operating regions of a gas-filled radiation detector. Region I is referred to as the recombination region, where the voltage is insufficient to separate the electrons and positive ions before substantial recombination occurs. Recombined charges are neutralized, and therefore no longer influenced by the externally applied voltage. Region II is the ion chamber region, where the electric field is high enough to prevent almost all recombination, thereby, allowing for collection of the electrons and positive ions. Region III is the proportional counter region, where the electric field is high enough to produce gain through impact ionization, while retaining output signals proportional to the energy deposited in the detector. Region IV is the Geiger-Muller region, where the avalanching produces space charge that limits the total pulse observed, consequently causing all pulses to be of nearly the same magnitude regardless of the type or energy of the radiation. Region V is the continuous discharge region, where uncontrolled avalanche multiplication takes place, a condition that can damage the detector.

Figure 3A:
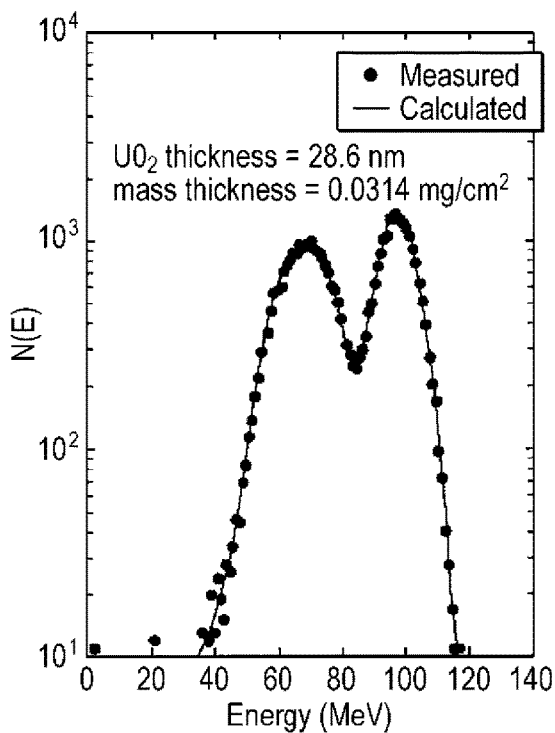
FIGS. 3A-3D show calculated and experimentally measured pulse height spectra of fission fragments from $UO_2$ film thicknesses of 28.6 nm, 714 nm, 2.53 μm and 7.54 μm, respectively, data from [5]
Figure 3B:
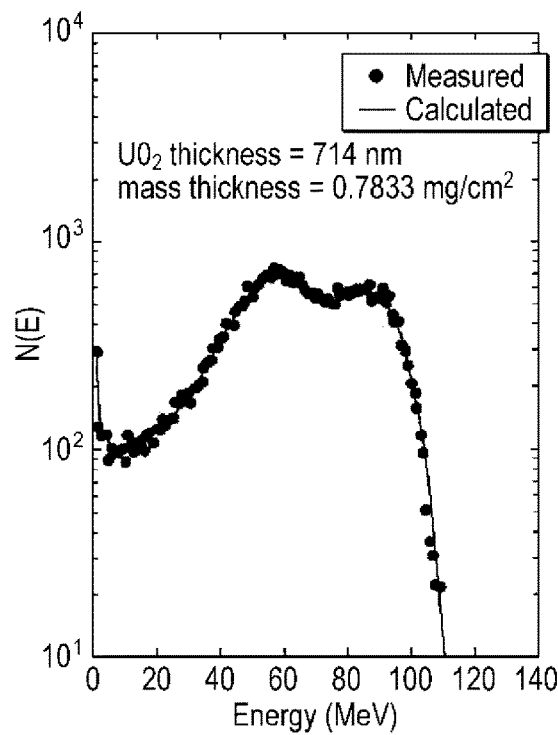
Figure 3C:
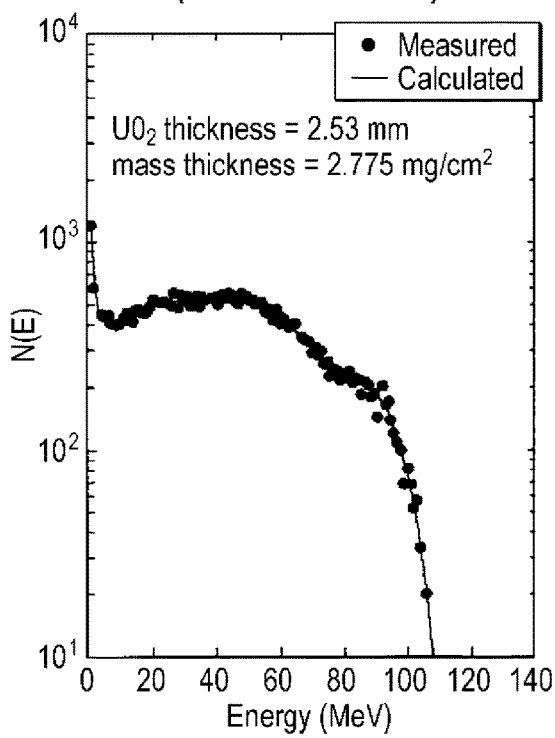
Figure 3D:
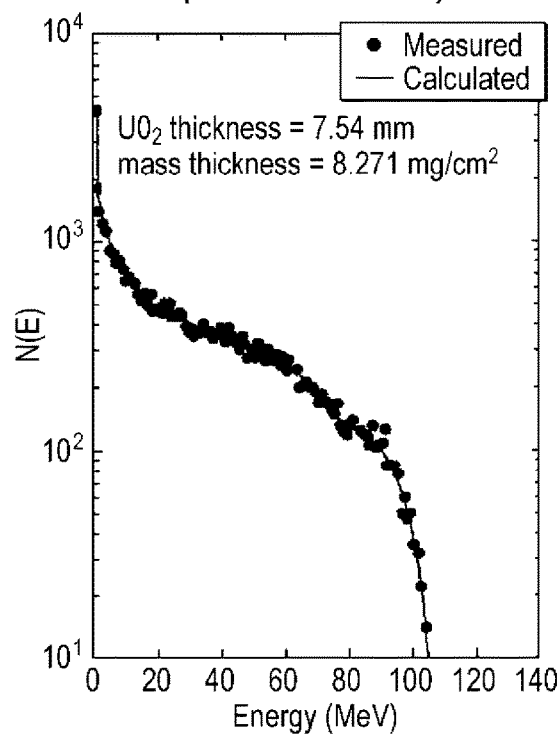

FIGS. 3A through 3D are displays of prior art data from reference [5], showing the effect of pulse height resolution as a function of the fissionable deposit thickness within a common fission chamber. In the figures, the fissionable material was $UO_2$. Shown in FIG. 3A is a pulse height spectrum from a fission chamber with a relatively thin coating of $UO_2$, in which both fission product branches are clearly visible. As the thickness of the fissionable material is increased, depicted in FIG. 3B-3D, fission product self-absorption effects degrade energy resolution, although the detector counting efficiency increases. Film thicknesses greater than the maximum fission product ranges cause a reduction in detection efficiency and are generally avoided.

Figure 4:
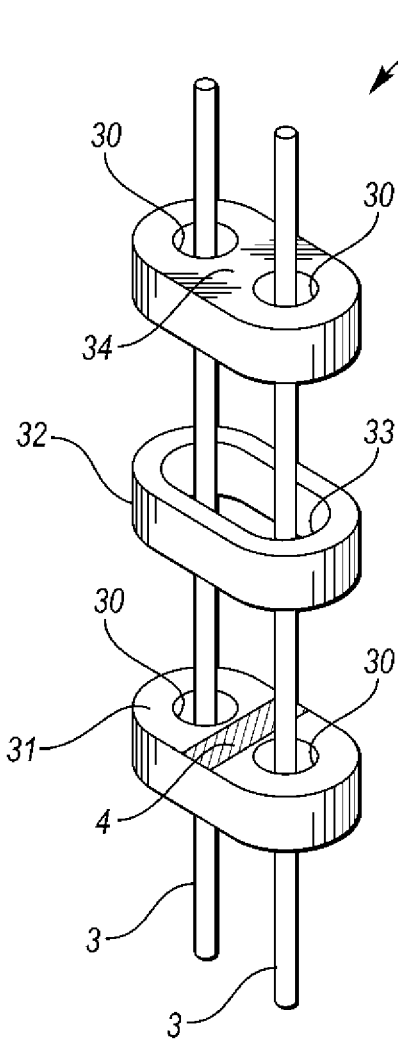
FIG. 4 is an exploded isometric view of an embodiment of a Multi-Wire Micro-Pocket Fission Detector.

FIG. 4 is an exploded isometric view of the Multi-Wire Micro-Pocket Fission Detector (17) with a neutron conversion material (4). The detector is comprised of an upper substrate piece (34), cavity substrate piece (32) and a bottom substrate piece (31). Electrode wires (3) pass through holes (30) in the upper substrate (34), lower substrate (31) and open chamber of cavity (33) in the cavity substrate (32). Neutrons are converted into charged particle reaction products in the conversion material (4) which then ionize the gas in the cavity (33) between the electrodes (3) within the cavity substrate (32). The electron-ion pairs induced in the pocket are then swept to the electrodes (3) using an applied bias, generating a pulse signal that is measured through the wire electrodes (3).

Figure 5:
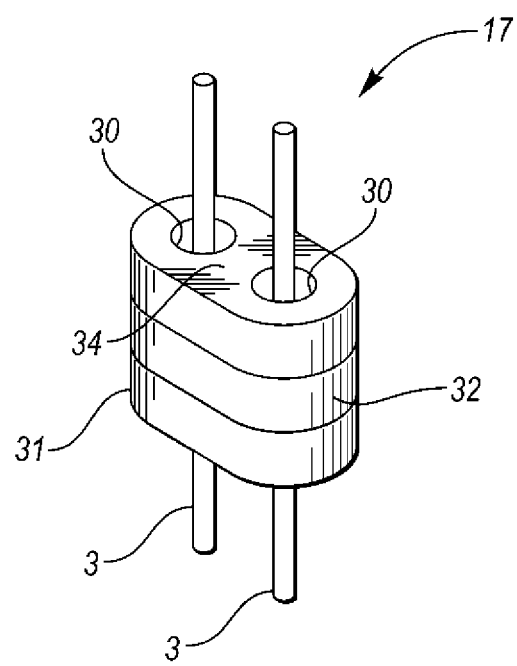
FIG. 5 is an isometric view of an embodiment of a Multi-Wire Micro-Pocket Fission Detector.

FIG. 5 is an isometric view of the Multi-Wire Micro-Pocket Fission chamber of FIG. 4 after assembly. The parts or pieces 31, 32 and 34 can be fastened or cemented together, or may remain unattached and free floating. In either case, the gas within the detector is the medium ionized by the reaction products emitted from the neutron reactive material.

Figure 6:
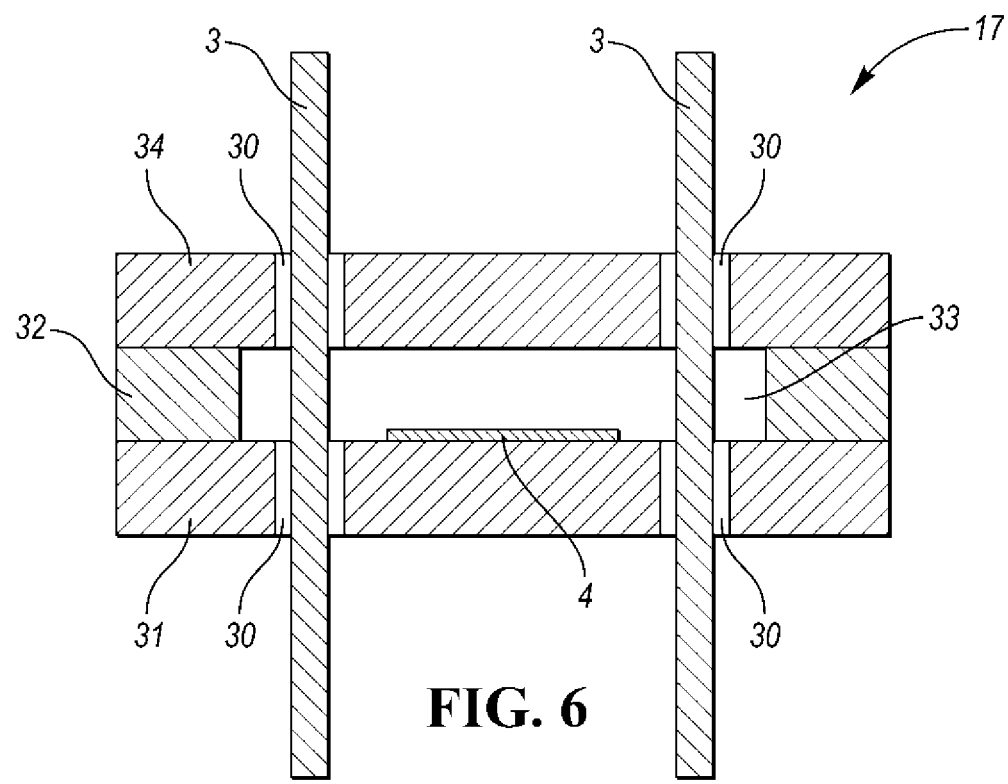
FIG. 6 is a cross-sectional view of an embodiment of a Multi-Wire Micro-Pocket Fission Detector.

FIG. 6 is a cross-sectional view of the Multi-Wire Micro-Pocket Fission Detector (17) with a neutron conversion material (4). The detector is comprised of an upper substrate (34), cavity substrate (32) and a bottom substrate (31). Electrode wires (3) pass through holes (30) in the upper substrate (34), lower substrate (31) and open cavity (33) in the cavity substrate (32). Neutrons are converted into charged particle reaction products in the conversion material (4) which then ionize the gas in the cavity (33) between the electrodes (3) within the cavity substrate (32). The electron-ion pairs induced in the pocket are then swept to the electrodes (3) using an applied bias, generating a pulse signal that is measured through the wire electrodes (3). The depiction in FIG. 6 has the neutron reactive material (4) coated upon the bottom substrate (31), although the neutron reactive material (4) can also be applied to the upper substrate (34).

Figure 7:
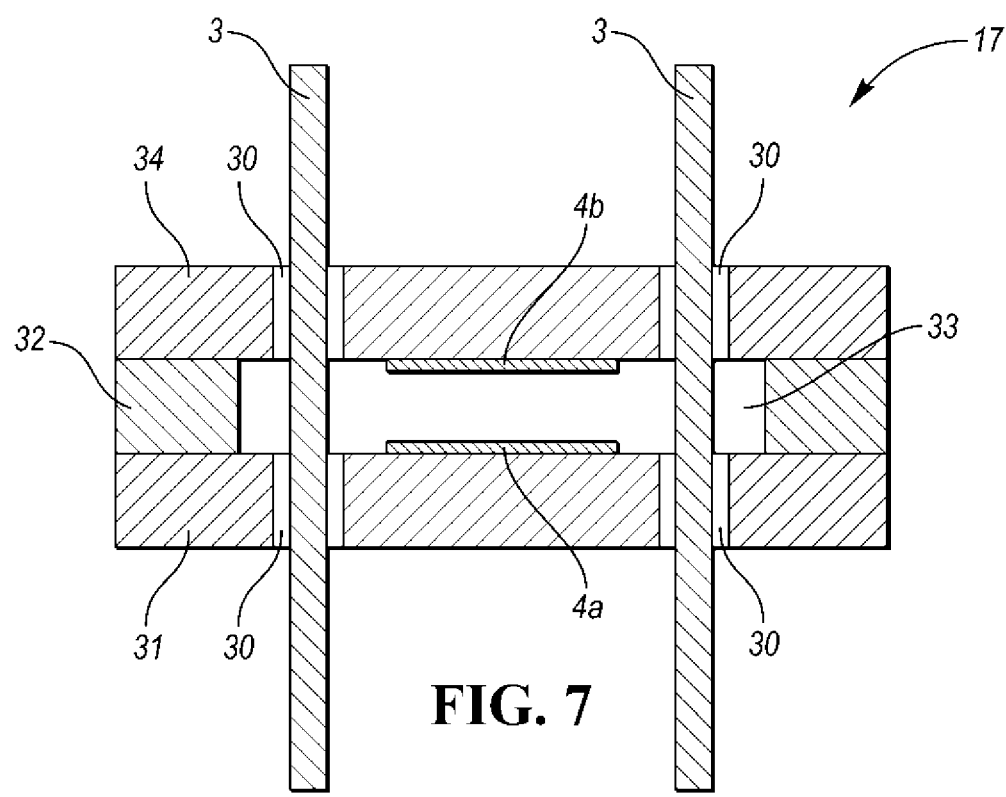
FIG. 7 is a cross-sectional view an embodiment of a Multi-Wire Micro-Pocket Fission Detector.

FIG. 7 is a cross-sectional view of the Multi-Wire Micro-Pocket Fission Detector (17) with a neutron conversion material (4a & 4b) deposited on multiple surfaces. The detector is comprised of an upper substrate (34), cavity substrate (32) and a bottom substrate (31). Electrode wires (3) pass through holes (30) in the upper substrate (34), lower substrate (31) and open cavity (33) in the cavity substrate (32), and neutron conversion material (4a & 4b), which may consist of the same, or dissimilar materials, all assembled with a detector gas pocket. The neutron conversion materials (4a & 4b) must not create an electronic short between the electrode materials (3) and may be located within the detector (not limited by depicted regions). Neutrons are converted into charged-particle reaction products in the conversion materials (4a & 4b) which then ionize the gas between the electrodes (3). The electron-ion pairs are then drifted to the electrodes (3) using an applied bias, generating a pulse signal that is measured through the wire electrodes (3).

Figure 8:
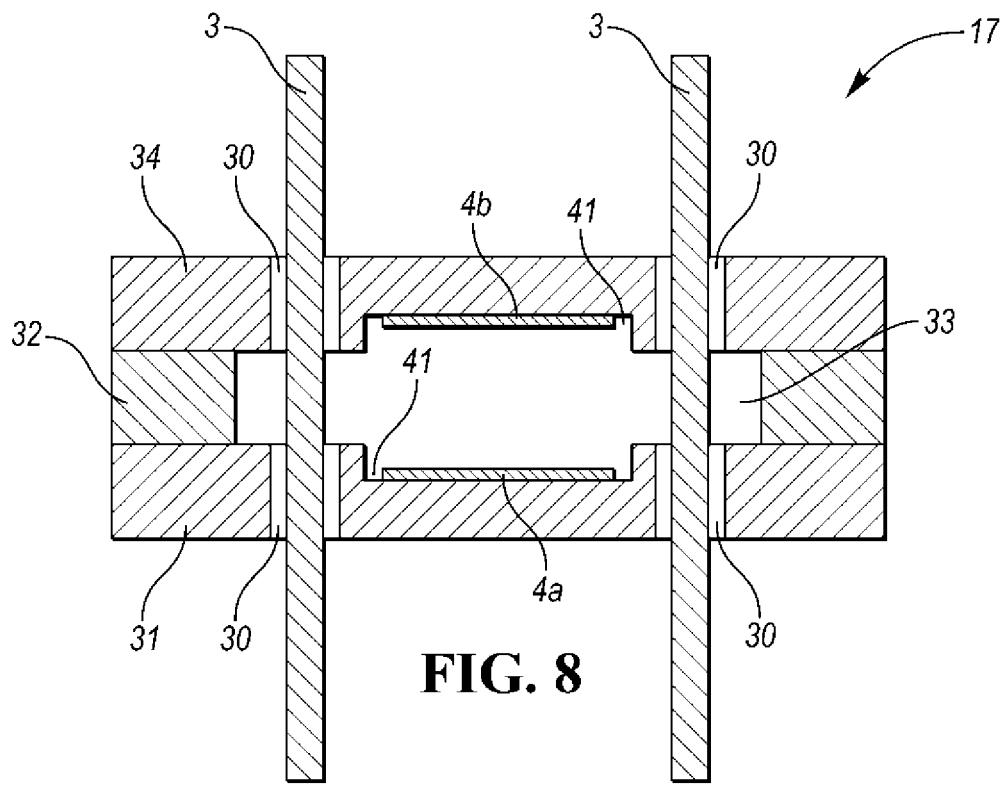
FIG. 8 is a cross-sectional view of an embodiment of a Multi-Wire Micro-Pocket Fission Detector.

FIG. 8 is a cross-sectional view of the Multi-Wire Micro-Pocket Fission Detector (17) with a neutron conversion material (4a & 4b) deposited on recessed regions (41) on multiple surfaces. The recess works to increase surface conduction path distances between the neutron conversion materials (4a & 4b) and the conductive wires (3) to decrease electrical conduction. The detector is comprised of an upper substrate (34), cavity substrate (32) and a bottom substrate (31). Electrode wires (3) pass through holes (30) in the upper substrate (34), lower substrate (31) and open cavity (33) in the cavity substrate (32). The neutron conversion material (4a & 4b), which may consist of the same, or dissimilar materials, is assembled within a detector gas pocket. The neutron conversion materials (4a & 4b) must not create an electronic short between the electrode materials (3) and may be located within the detector (not limited by depicted regions). Neutrons are converted into charged-particle reaction products in the conversion materials (4a & 4b) which then ionize the gas between the electrodes (3). The electron-ion pairs are then drifted to the electrodes (3) using an applied bias, generating a pulse signal that is measured through the wire electrodes (3).

Figure 9:
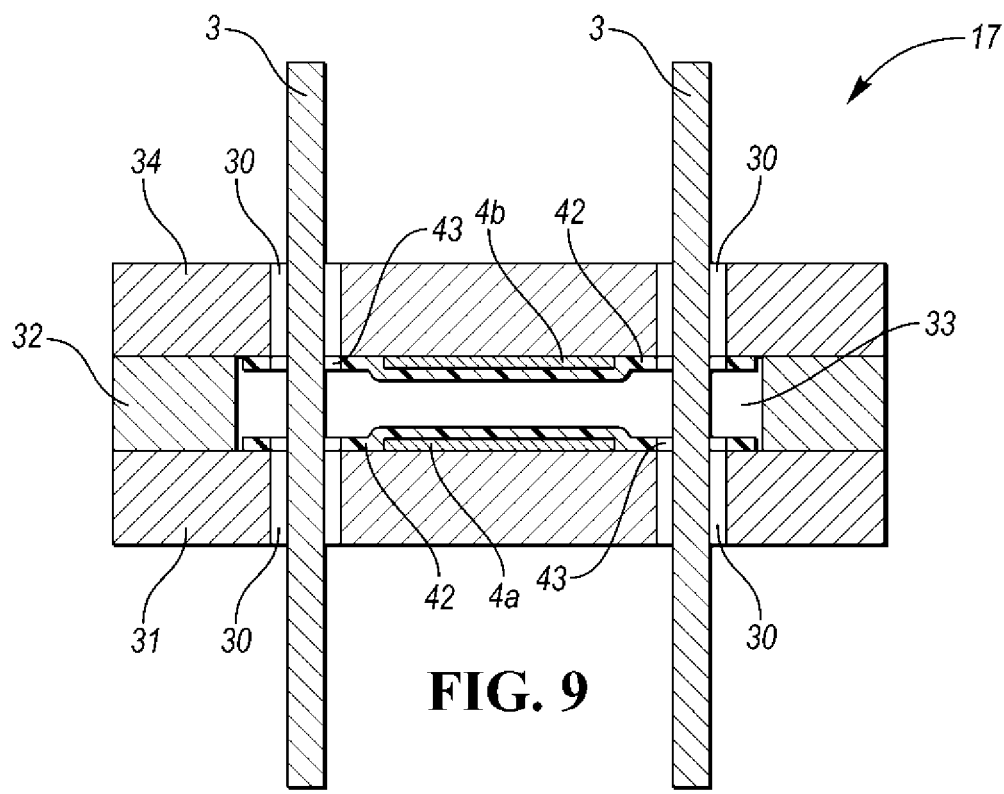
FIG. 9 is a cross-sectional view of an embodiment of a Multi-Wire Micro-Pocket Fission Detector.

FIG. 9 is a cross-sectional view of the Multi-Wire Micro-Pocket Fission Detector (17) with a neutron conversion material (4a & 4b) on multiple surfaces. An insulating coating (42), such as aluminum oxide ($Al_2O_3$), silicon nitride ($SiN_3$), or silicon dioxide ($SiO_2$) is deposited over the neutron conversion material (4a & 4b). The insulating coating (42) works to reduce surface conduction between the neutron conversion materials (4a & 4b) and the conductive wires (3). The detector is comprised of an upper substrate (34), cavity substrate (32) and a bottom substrate (31). Electrode wires (3) pass through holes (30) in the upper substrate (34), lower substrate (31) and open cavity (33) in the cavity substrate (32), and also holes (43) through the insulating coating (42). The neutron conversion material (4a & 4b), which may consist of the same, or dissimilar materials, is assembled within a detector gas pocket. The neutron conversion materials (4a & 4b) must not create an electronic short between the electrode materials (3) and may be located within the detector (not limited by depicted regions). Neutrons are converted into charged-particle reaction products in the conversion materials (4a & 4b) which then ionize the gas between the electrodes (3). The electron-ion pairs are then drifted to the electrodes (3) using an applied bias, generating a pulse signal that is measured through the wire electrodes (3).

Figure 10:
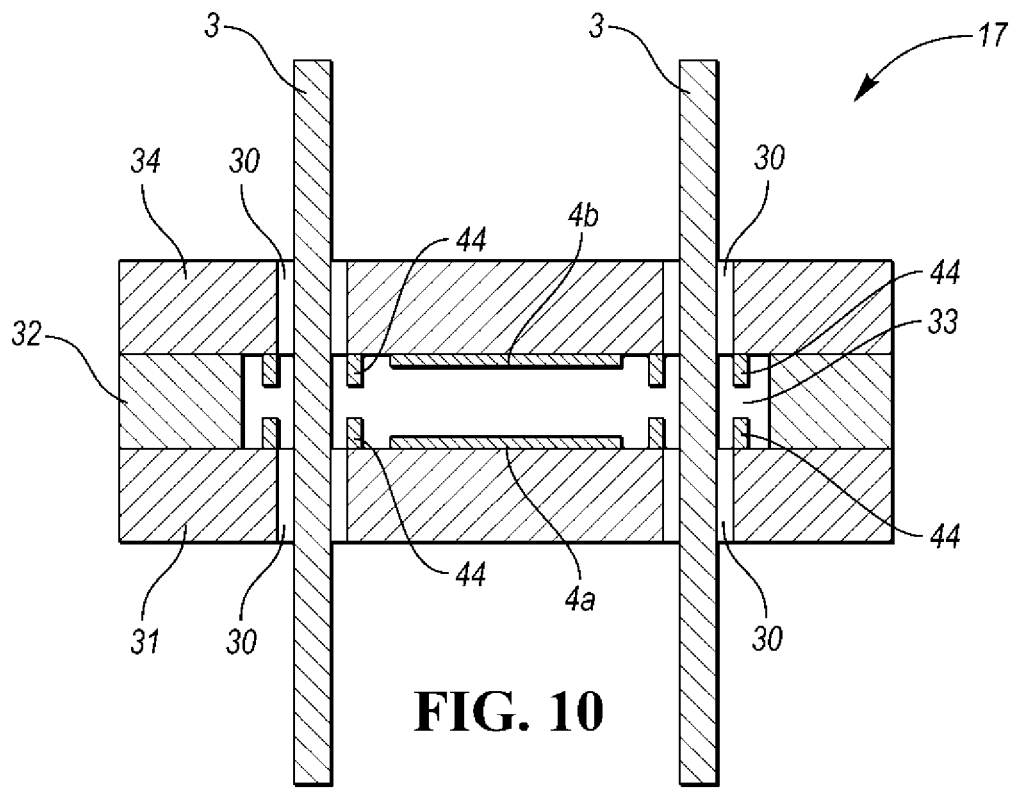
FIG. 10 is a cross-sectional view of an embodiment of a Multi-Wire Micro-Pocket Fission Detector.

FIG. 10 is a cross-sectional view of the Multi-Wire Micro-Pocket Fission Detector (17) with a neutron conversion material (4a & 4b) on multiple surfaces. Insulating spacers (44), such as aluminum oxide ($Al_2O_3$), silicon nitride ($SiN_3$), or silicon dioxide ($SiO_2$), are placed around the conductive wires (3). The insulating spacers (44) work to reduce surface conduction between the neutron conversion materials (4a & 4b) and the conductive wires (3). The detector is comprised of an upper substrate (34), cavity substrate (32) and a bottom substrate (31). Electrode wires (3) pass through holes (30) in the upper substrate (34), lower substrate (31) and open cavity (33) in the cavity substrate (32), and also the insulating spacers (44). The neutron conversion material (4a & 4b), which may consist of the same, or dissimilar materials, is assembled within a detector gas pocket. The neutron conversion materials (4a & 4b) must not create an electronic short between the electrode materials (3) and may be located within the detector (not limited by depicted regions). Neutrons are converted into charged-particle reaction products in the conversion materials (4a & 4b) which then ionize the gas between the electrodes (3). The electron-ion pairs are then drifted to the electrodes (3) using an applied bias, generating a pulse signal that is measured through the wire electrodes (3).

Figure 11:
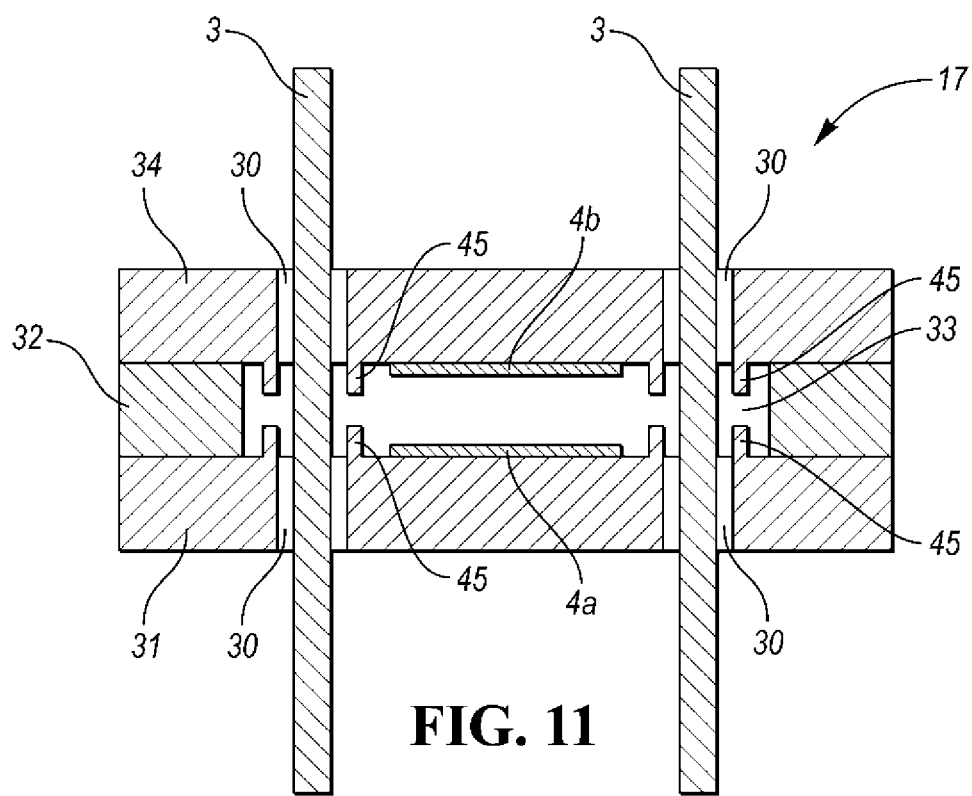
FIG. 11 is a cross-sectional view of an embodiment of a Multi-Wire Micro-Pocket Fission Detector.

FIG. 11 is a cross-sectional view of the Multi-Wire Micro-Pocket Fission Detector (17) with a neutron conversion material (4a & 4b) on multiple surfaces. Insulating ridges (45) are fashioned in the substrate around the conductive wires (3). The insulating ridges (45) work to reduce surface conduction between the neutron conversion materials (4a & 4b) and the conductive wires (3). The detector is comprised of an upper substrate (34), cavity substrate (32) and a bottom substrate (31). Electrode wires (3) pass through holes (30) in the upper substrate (34), lower substrate (31) and open cavity (33) in the cavity substrate (32). The neutron conversion material (4a & 4b), which may consist of the same, or dissimilar materials, is assembled within a detector gas pocket. The neutron conversion materials (4a & 4b) must not create an electronic short between the electrode materials (3) and may be located within the detector (not limited by depicted regions). Neutrons are converted into charged-particle reaction products in the conversion materials (4a & 4b) which then ionize the gas between the electrodes (3). The electron-ion pairs are then drifted to the electrodes (3) using an applied bias, generating a pulse signal that is measured through the wire electrodes (3).

Figure 12:
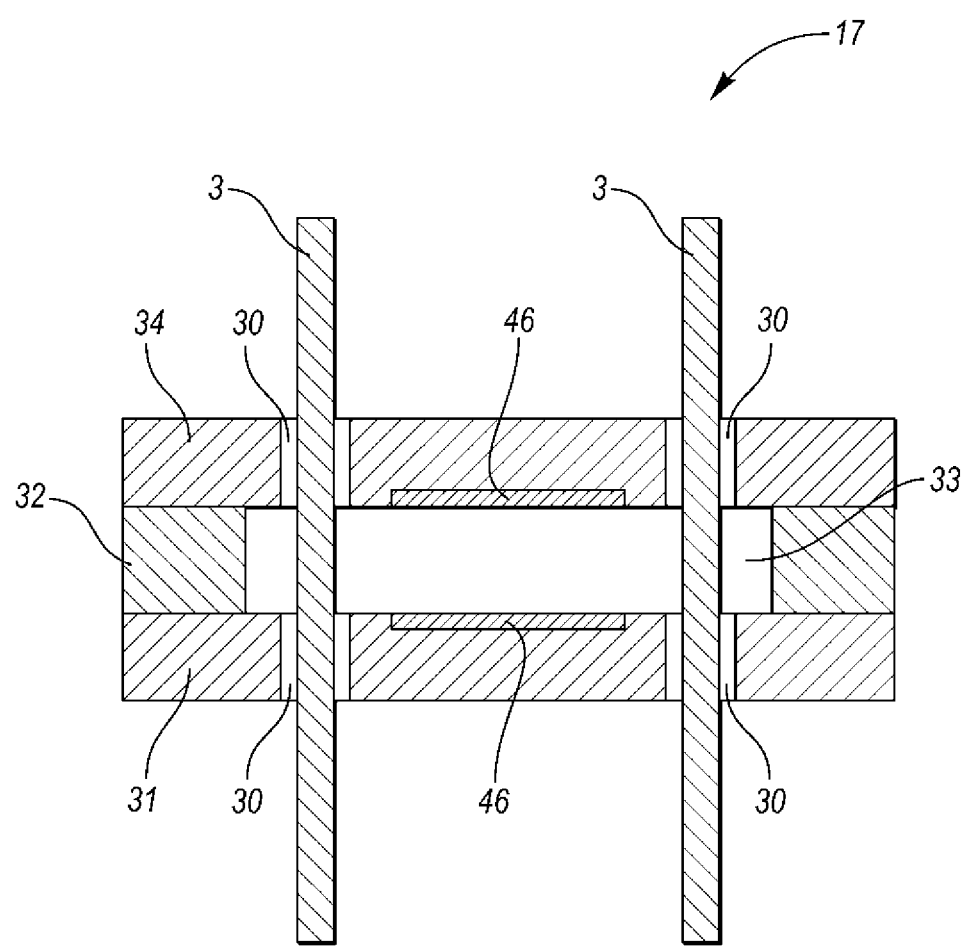
FIG. 12 is a cross-sectional view of an embodiment of a Multi-Wire Micro-Pocket Fission Detector.

FIG. 12 is a cross-sectional view of the Multi-Wire Micro-Pocket Fission Detector (17) with a neutron conversion material (46) incorporated within or comprising of the detector substrate (31) and/or (34). The detector is comprised of an upper substrate (34), cavity substrate (32) and a bottom substrate (31). Electrode wires (3) pass through holes (30) in the upper substrate (34), lower substrate (31) and open cavity (33) in the cavity substrate (32). The neutron conversion material (46), which may consist of the same, or dissimilar materials, is assembled within a detector gas pocket as a part of a substrate material (31) and/or (34). The neutron conversion materials (46) must not create an electronic short between the electrode materials (3) and may be located within the detector (not limited by depicted regions). Neutrons are converted into charged-particle reaction products in the conversion materials (46) which then ionize the gas between the electrodes (3). The electron-ion pairs are then drifted to the electrodes (3) using an applied bias, generating a pulse signal that is measured through the wire electrodes (3).

Figure 13:
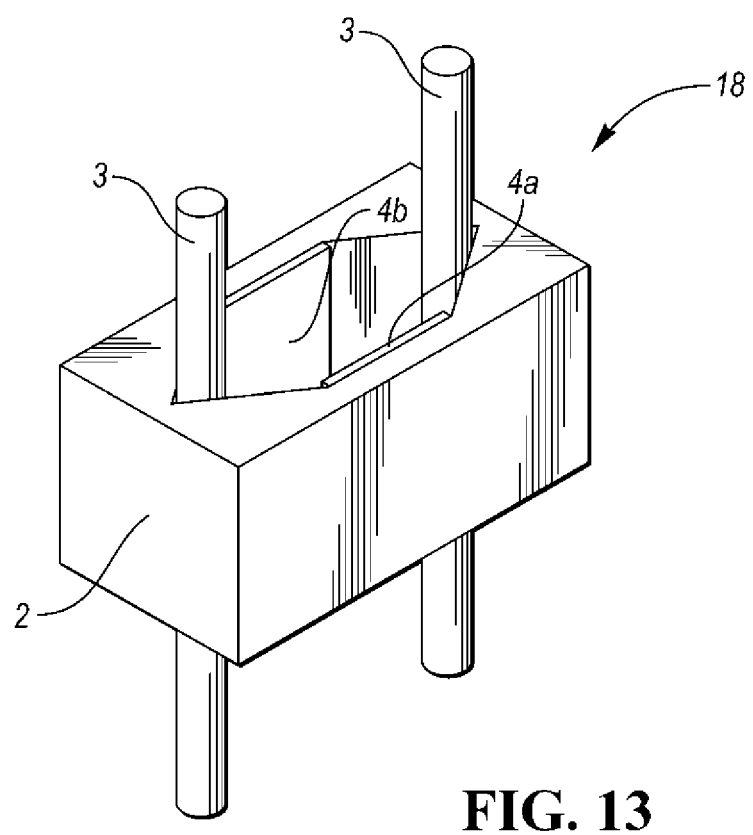
FIG. 13 is an isometric view of an embodiment of a Multi-Wire Micro-Pocket Fission Detector.

FIG. 13 is an isometric view of an embodiment of a Single-Piece Multi-Wire Micro-Pocket Fission Detector (18) with a neutron conversion material (4a & 4b) deposited on multiple surfaces. The detector is comprised of a dielectric substrate (2), electrode materials (3), and neutron conversion material (4a & 4b), which may consist of the same, or dissimilar materials, all assembled with a detector gas pocket. The neutron conversion materials (4a & 4b) must not create an electronic short between the electrode materials (3) and may be located within the detector (not limited by depicted regions). Neutrons are converted into charged-particle reaction products in the conversion materials (4a & 4b) which then ionize the gas between the electrodes (3). The electron-ion pairs induced in the pocket are then swept to the electrodes (3) using an applied bias, generating a pulse signal that is read out through the wire electrodes (3).

Figure 14:
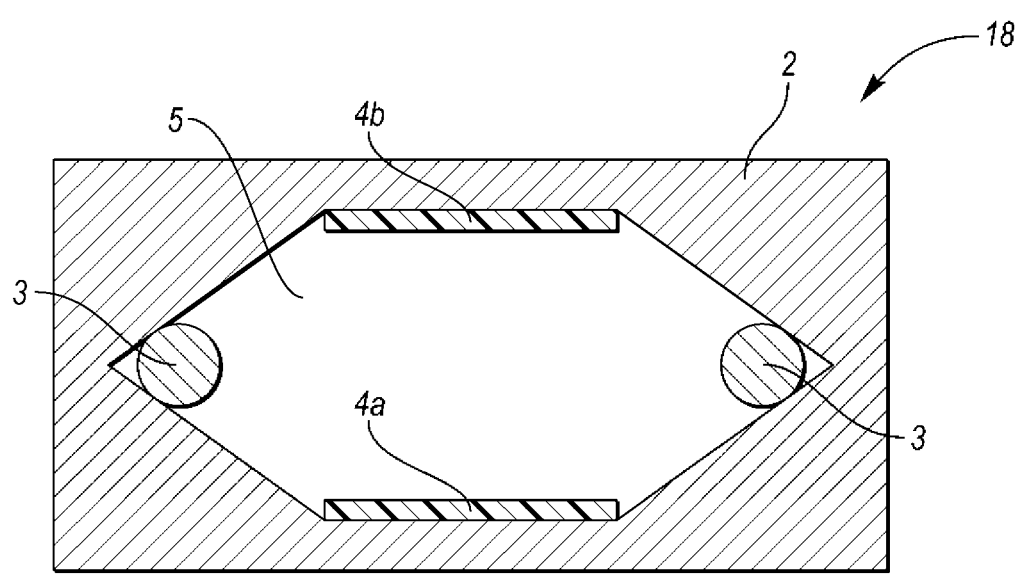
FIG. 14 is a cross-sectional view of an embodiment of a Multi-Wire Micro-Pocket Fission Detector.

FIG. 14 a cross-sectional view of the Single-Piece Multi-Wire Micro-Pocket Fission Detector (18) of FIG. 13 with a neutron conversion material deposited on multiple surfaces (4a & 4b). The detector is comprised of a dielectric substrate (2), electrode materials (3), and neutron conversion material (4a & 4b), which may consist of the same, or dissimilar materials, all assembled with a detector gas pocket. The neutron conversion materials (4a & 4b) must not create an electronic short between the electrode materials (3) and may be located within the detector (not limited by depicted regions). Neutrons are converted into charged-particle reaction products in the conversion materials (4a & 4b) which then ionize the gas (5) between the electrodes (3). The electron-ion pairs induced in the pocket are then swept to the electrodes (3) using an applied bias, generating a pulse signal that is read out through the wire electrodes (3).

Figure 15:
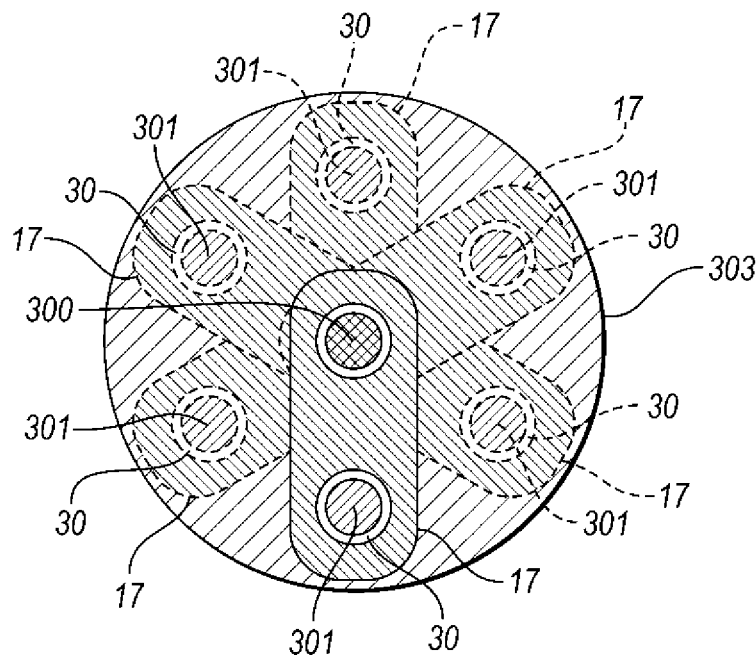
FIG. 15 is a cross-sectional top view of an array of Multi-Wire Micro-Pocket Fission Detectors.

FIG. 15 is a top view of an array of Multi-Wire Micro-Pocket Fission Detectors (17). Each Multi-Wire Micro-Pocket Fission Detector shares a single central electrode (300) and has a separate second electrode (301). The shared electrode (300) may be the anode or the cathode, while the separate second electrodes (301) may be the cathodes or anodes, respectively. An optional guide plate (303) is used to prevent tangling and guide the numerous electrode wires (301) through each of the Multi-Wire Micro-Pocket Fission Detectors (17).

Figure 16:
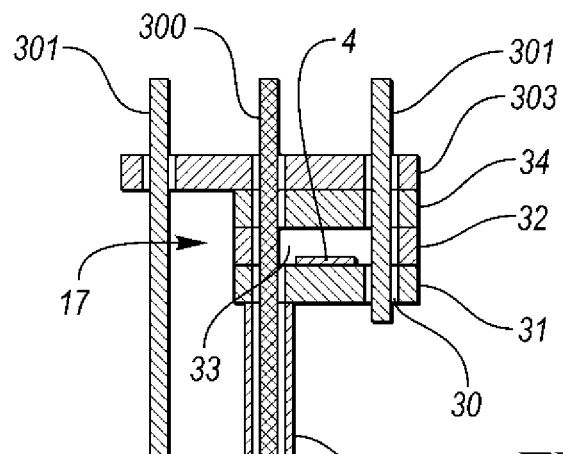
FIG. 16 is a cross-sectional side view of an array of Multi-Wire Micro-Pocket Fission Detectors showing two such detectors.
Figure 16:
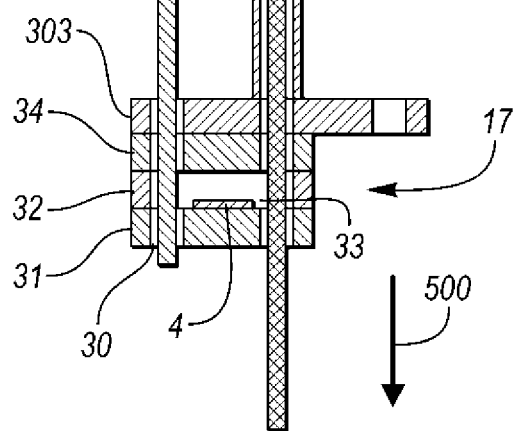

FIG. 16 is a cross-sectional view of an array of Multi-Wire Micro-Pocket Fission Detectors with a neutron conversion material (4) showing two such detectors. Each Multi-Wire Micro-Pocket Fission Detector shares a single central electrode (300) and has a separate second electrode (301). The shared electrode (300) may be the anode or the cathode, while the separate second electrodes (301) may be the cathodes or anodes, respectively. An optional guide plate (303) is used to prevent tangling and guide the numerous electrode wires (301) through each of the Multi-Wire Micro-Pocket Fission Detectors (17). Each detector is comprised of an upper substrate (34), cavity substrate (32) and a bottom substrate (31). Electrode wires (3) pass through holes (30) in the upper substrate (34), lower substrate (31) and open cavity (33) in the cavity substrate (32). Neutrons are converted into charged-particle reaction products in the conversion material (4) which then ionize the gas in the cavity (33) between the electrodes (3) within the cavity substrate (32). The electron-ion pairs induced in the pocket are then swept to the electrodes (300) and (301) using an applied bias, generating a pulse signal that is measured through the wire electrodes (300) and (301). The depiction in FIG. 16 has the neutron reactive material (4) coated upon the bottom substrate (31), although the neutron reactive material (4) can also be applied to the upper substrate (34) or both upper (34) and lower (31) substrates. The sharing of the central electrode (300) reduces the required number of electrode wires while keeping the signals from each detector (17) separate by use of the unshared independent electrode wires (301). A spacer (302) is used to keep the detectors (17) spaced apart at predetermined distances from each other. The array may extend to several additional detectors (17), indicated by the arrow (500) pointing downward.

Figure 17:
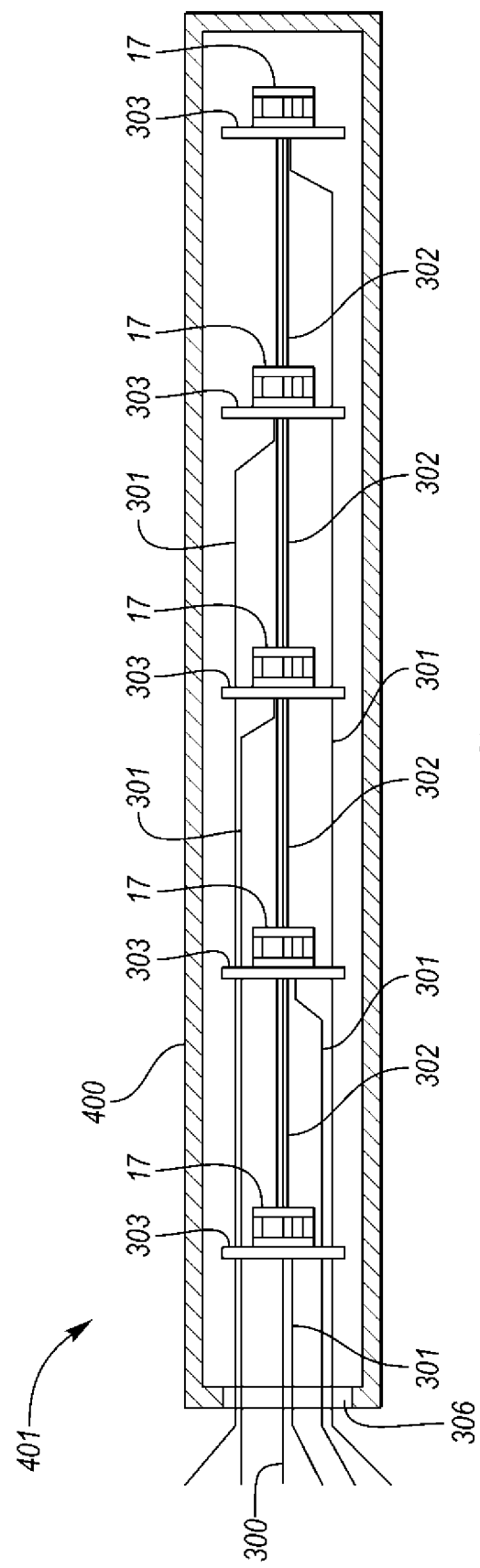
FIG. 17 is a cross-sectional view of an array of Multi-Wire Micro-Pocket Fission Detectors showing five such detectors in a closed assembly.

FIG. 17 is a cross-sectional view of an array of Multi-Wire Micro-Pocket Fission Detectors (17) showing five such detectors in a closed assembly (401). The detectors (17) each have a guide plate (303) and all share a common central electrode (300). Each detector (17) has an independent second electrode (301). The detector array is encased in a gas-filled tube (400) and sealed. The electrodes (300) and (301) protrude from the gas-filled tube (400) through an insulating feedthrough (306).

Figure 18:
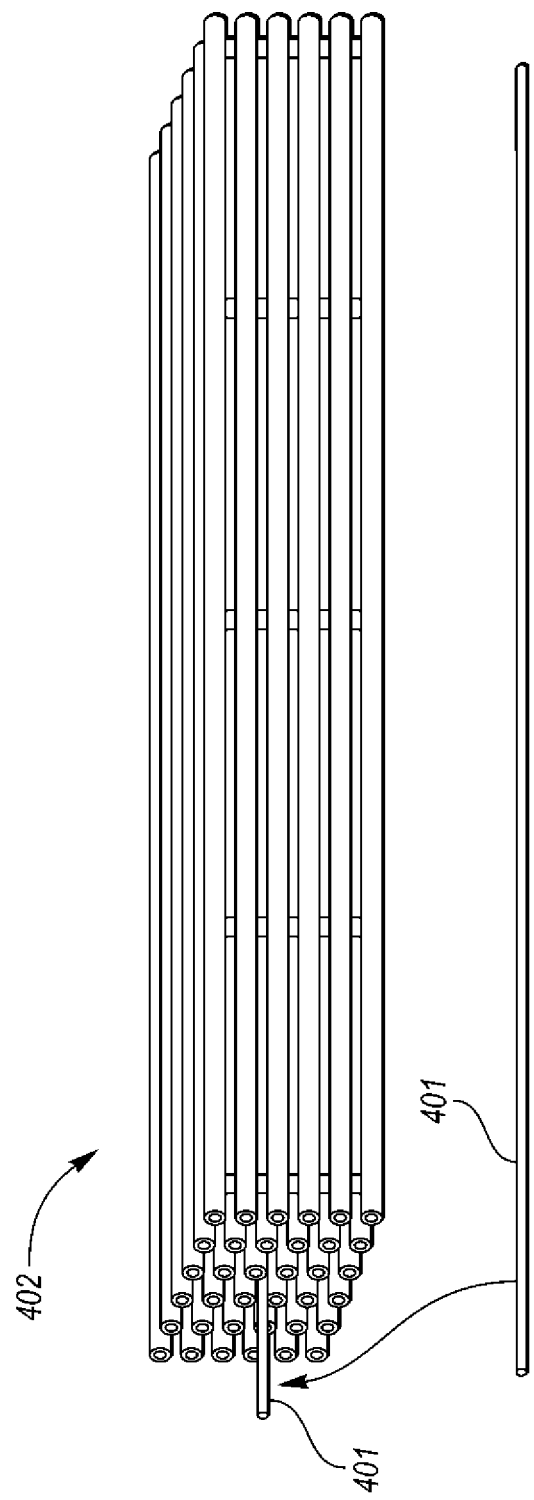
FIG. 18 is a depiction of an assembly array of Multi-Wire Micro-Pocket Fission Detectors inserted into a nuclear fuel bundle.

FIG. 18 is a depiction of an assembly array (401) of Multi-Wire Micro-Pocket Fission Detectors inserted into a nuclear fuel bundle (402).

At least one embodiment of the invention is a multi-wire, micro-pocket, fission chamber neutron detector. Previous fission chambers rely on opposing, parallel-plate-style or co-axial electrodes, whereas at least one embodiment of the present invention uses pairs of wires, thereby, reducing detector capacitance, and simplifying assembly.

Another primary component of at least one embodiment of the invention is a smaller gas chamber than the prior art. One prior detector uses a >1-mm$^3$ volume chamber whereas at least one embodiment of the invention, which uses a micro-sized chamber, can reduce false counts from competing interactions within the chamber by reducing the chamber volume to much less than the prior art of 1 mm$^3$ or greater without sacrificing neutron detection capabilities.

Therefore, at least one embodiment of the invention provides a smaller physical detector (one that can fit into reactor cooling channels, a feat that most commercial fission chamber detectors cannot achieve), minimizes reactor flux perturbation, and reduces signal contributions from competing particles. The parallel wire design simplifies manufacturing and allows for numerous detectors to be constructed in parallel inside of a single assembly, thereby, producing a multi-node detector array to provide spatial neutron flux information.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A device for detecting neutrons and configured to operate within a high-radiation environment to measure local neutron flux without significantly perturbing the local neutron flux, the device comprising:
   a micro-sized, reaction-product, detection chamber;
   an inert housing or substrate having at least one inner surface and a pair of spaced outer surfaces in fluid communication with each other via the detection chamber, wherein the volume of the detection chamber is composed of a gas which is sized and shaped such that a fission fragment deposits much more energy in the gas than competing particles, such that competing interactions can be discriminated wherein the detection chamber is open to an exterior of the device to allow the gas to flow into and out of the chamber;
   neutron responsive material disposed on or near at least one inner surface at least partially defining the detection chamber, the material being responsive to neutrons absorbed thereby releasing reaction products into the detection chamber creating ionized charge carriers; and
   a plurality of electrodes including a single anode wire and a single cathode wire, each of the wires being composed of materials generally insensitive to radiation exposure for creating an electric field within the chamber upon application of a voltage to the electrode wires, the anode and cathode wires extending completely through the substrate including the detection chamber between the spaced outer surfaces, the electric field causing charge carriers in the detection chamber to drift through the detection chamber and induce charge motion at the anode and cathode to produce an electrical output signal wherein the anode and cathode wires serve as both signal wires and the electrodes so that the device has reduced detection capacitance, improved device robustness and simplified fabrication.

2. The device as claimed in claim 1, wherein the electrodes are free of fissile material deposits and wherein one or more different neutron responsive materials are disposed on one or more inner surfaces within the detection chamber.

3. The device as claimed in claim 1, wherein at least one of the substrate materials of the detection chamber is at least partially composed of one or more neutron responsive materials.

4. A device as claimed in claim 1, wherein the neutron responsive material composition is similar to the nuclear material being monitored for the purpose of determining fission rate of said nuclear material.

5. The device as claimed in claim 1, further comprising an insulating layer encapsulating the fissile material, thereby, electrically insulating the electrodes.

6. The device as claimed in claim 1, wherein the neutron responsive material is suspended and/or grown within the volume of the chamber.

7. The device as claimed in claim 1, wherein the substrate includes a plurality of pieces which are loosely assembled together forming the detection chamber.

8. The device as claimed in claim 1, wherein the substrate is manufactured as a single piece.

9. The device as claimed in claim 1, wherein the substrate is composed of materials generally insensitive to neutron exposure, such as those with low neutron-absorption cross sections such as Si, SiO$_2$, Quartz, SiC, AlN, GaN, Al$_2$O$_3$, BeO, diamond, or MgO.

10. The device as claimed in claim 1, wherein the neutron reaction ions from the neutron responsive material cause sputtering of ions from the substrates, thereby, producing the required ionization in the detector for current detection.

11. An instrument composed of an array of devices of claim 1, used to measure neutron flux at multiple locations concurrently wherein either the anode wire or the cathode wire is shared by different devices of the array as a shared electrode.

12. The instrument as claimed in claim 11, wherein the array of devices share a common anode and a common cathode.

13. The instrument as claimed in claim 11, further including a device which has no neutron responsive material for the compensation of signal produced from non-neutron induced events.

14. A nuclear fuel assembly within which at least one device of claim 1 is incorporated.

15. The device as claimed in claim 1, wherein the volume of the detection chamber is wholly or partially compartmentalized.

* * * * *